(12) United States Patent  
Weiner

(10) Patent No.: US 7,570,851 B2  
(45) Date of Patent: Aug. 4, 2009

(54) ULTRASHORT PHOTONIC WAVEFORM MEASUREMENT USING QUASI-PHASE-MATCHED NON-LINEAR OPTICS

(75) Inventor: Andrew M. Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 149 days.

(21) Appl. No.: 11/172,620

(22) Filed: Jun. 30, 2005

(65) Prior Publication Data

US 2006/0088259 A1   Apr. 27, 2006

Related U.S. Application Data

(60) Provisional application No. 60/590,284, filed on Jul. 21, 2004.

(51) Int. Cl.
G02B 6/26 (2006.01)
G02B 9/02 (2006.01)

(52) U.S. Cl. .............................. 385/36; 385/38; 356/491

(58) Field of Classification Search .................. 385/36, 385/38; 356/450, 491
See application file for complete search history.

(56) References Cited

U.S. PATENT DOCUMENTS

| 4,973,160 | A * | 11/1990 | Takiguchi et al. ........... 356/450 |
|---|---|---|---|
| 5,815,307 | A | 9/1998 | Arbore et al. |
| 5,867,304 | A | 2/1999 | Galvanauskas et al. |
| 6,181,463 | B1 | 1/2001 | Galvanauskas et al. |
| 6,198,568 | B1 | 3/2001 | Galvanauskas et al. |
| 6,208,448 | B1 | 3/2001 | Shibata |
| 6,362,513 | B2 * | 3/2002 | Wester ........................ 257/432 |
| 6,504,612 | B2 | 1/2003 | Trebino |
| 6,595,685 | B2 * | 7/2003 | Baba et al. ................... 374/161 |
| 2001/0017727 | A1 | 8/2001 | Sucha et al. |

OTHER PUBLICATIONS

M.A.Arbore, A.Galvanaskas, D.Harter, M.H.Chou, M.M.Fejer, "Engineerable compression of ultrashort pulses by use of second-harmonic generation in chirped-period-poled lithium niobate"; 1997 Optical Society America/vol. 22, No. 17/Optics Letters, Sep. 1, 1997, pp. 1341-1343.

G.Imeshev, A.Galvanauskas, D.Harter, M.A.Arbore, M.Proctor, M.M.Fejer, "Engineerable femtosecond pulse shaping by second-harmonic generation with Fourier synthetic quasi-phase-matching gratings", 1998 Optical Society of America/vol. 23, No. 11/Optics Letters, Jun. 1, 1998, pp. 864-866.

Z.Zheng, A.M.Weiner, K.R.Parameswaran, M.H.Chou, M.M.Fejer, "Femtosecond second-harmonic generation in periodically poled lithium niobate waveguides with simultaneous strong pump depletion and group-velocity walk-off", 2002 Optical Society of America/vol. 19, No. 4/J.Opt.Soc.Am.B, pp. 839-848.

(Continued)

*Primary Examiner*—Jerry T Rahll
(74) *Attorney, Agent, or Firm*—Brinks Hofer Gilson & Lione

(57) ABSTRACT

A short-pulse measurement and detection apparatus utilizing an aperiodic non-linear quasi-phase matched (A-QPM) material. The bandwidth of the A-QPM non-linear material is such that an interaction between a first signal and a second signal occurs, facilitating measurements of signal properties by techniques such as intensity auto-correlation, intensity cross-correlation, and pulse sampling.

52 Claims, 8 Drawing Sheets

OTHER PUBLICATIONS

G.Imeshev, M.M.Fejer, A.Galvanauskas, D.Harter, "Generation of dual-wavelength pulses by frequency doubling with quasi-phase-matching gratings", 2001 Optical Society of America/vol. 26, No. 5/Optics Letters, Mar. 1, 2001, pp. 268-270.

P.O'Shea, M.Kimmel, X.Gu, R.Trebino, "Highly simplified device for ultrashort-pulse measurement", 2001 Optical Society of America/vol. 26, No. 12/Optics Letters, Jun. 15, 2001, pp. 932-934.

A.M.Weiner, A.M.Kan'an, D.E.Leaird, "High-efficiency blue generation by frequency doubling of femtosecond pulses in a thick nonlinear crystal", 1998 Optical Society of America/vol. 23, No. 18/Optics Letters, Sep. 15, 1998, pp. 1441-1443.

P.O'Shea, M.Kimmel, X.Gu, R.Trebino, "Increased-bandwidth in ultrashort-pulse measurement using an angle-dithered nonlinear-optical crystal", Optics Express, vol. 7/No. 10, Nov. 6, 2000, pp. 342-349.

Z.Zheng, A.M.Weiner, K.R.Parameswaran, M.H.Chou, M.M.Fejer, "Low-Power Spectral Phase Correlator Using Periodically Poled $LiNbO_3$ Waveguides", IEEE Photonics Technology Letters, vol. 13, No. 4, Apr. 2001, pp. 376-378.

G.Taft, A.Rundquist, M.M.Murnane, I.P.Christov, H.C.Kapteyn, K.W.DeLong, D.N.Fittinghoff, M.A.Krumbugel, J.N.Sweetser, R.Trebino, "Measurement of 10-fs Laser Pulses", IEEE Journal of Selected Topics in Quantum Electronics, vol. 2, No. 3, Sep. 1996, pp. 575-585.

R. Trebino, K.W.DeLong, D.N.Fittinghoff, J.N.Sweetser, M.A.Krumbugel, B.A.Richman, "Measuring ultrashort laser pulses in the time-frequency domain using frequency-resolved optical gating", 1997 American Institute of Physics, Rev.Sci.Instrum.68(9), Sep. 1997, pp. 3277-3295.

M.H.Chou, K.R.Parameswaran, M.M.Fejer, "Multiple-channel wavelength conversion by use of engineered quasi-phase-matching structures in $LiNbO_3$ waveguides", 1999 Optical Society of American, vol. 24, No. 16, Optics Letters, Aug. 15, 1999, pp. 11571159.

M.M.Fejer, G.A.Magel, D.H.Jundt, R.L.Byer, "Quasi-Phase-Matched Second Harmonic Generation: Tuning and Tolerances", IEEE Journal of Quantum Electronics, vol. 28, No. 11, Nov. 1992, pp. 2631-2654.

J.K.Rhee, T.S.Sosnowski, A.C.Tien, T.B.Norris, "Real-time dispersion analyzer of femtosecond laser pulses with use of a spectrally and temporally resolved upconversion technique", 1996 Optical Society of America, J.Opt.Soc.Am.B/vol. 13, No. 8, Aug. 1996, pp. 1780-1785.

S.Wielandy, M.Fishteyn, T.Her, D.Kudelko, C.Zhang, "Real-time measurement of accumulated chromatic dispersion for automatic dispersion compensation", Electronics Letters, vol. 38, No. 20, Sep. 26, 2002, pp. 1198-1199.

C.Iaconis, I.A.Walmsley, "Spectral phase interferometry for direct electric-field reconstruction of ultrashort optical pulses", 1998 Optical Society of America, Optics Letters, vol. 23, No. 10, May 15, 1998, pp. 792-794.

G.Imeshev, M.A.Arbore, M.M.Fejer, A.Galvanauskas, M.Fermannj, D.Harter, "Ultrashort-pulse second-harmonic generation with longitudinally nonuniform quasi-phase-matching gratings: pulse compression and shaping", Optical Society of America, J.Opt.Soc.Am. B/vol. 17, No. 2, Feb. 2000, pp. 304-318.

S.D.Yang, A.M.Weiner, K.R.Parameswaran, M.M.Fejer, "High Efficiency Ultrashort Pulse Measurement with Aperiodically Poled Lithium Niobate (A-PPLN) Waveguides", Purdue University, IEEE LEOS Annual Meeting, Tucson AZ (Oct. 28, 2003), pp. 1-13.

* cited by examiner

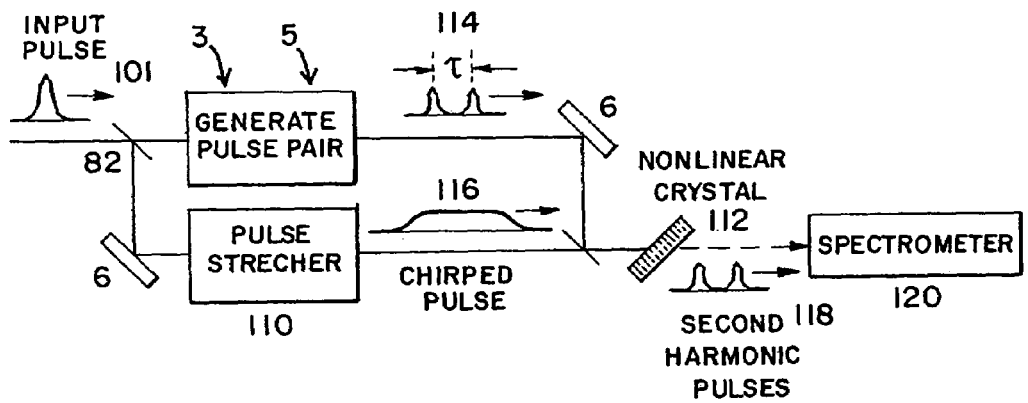
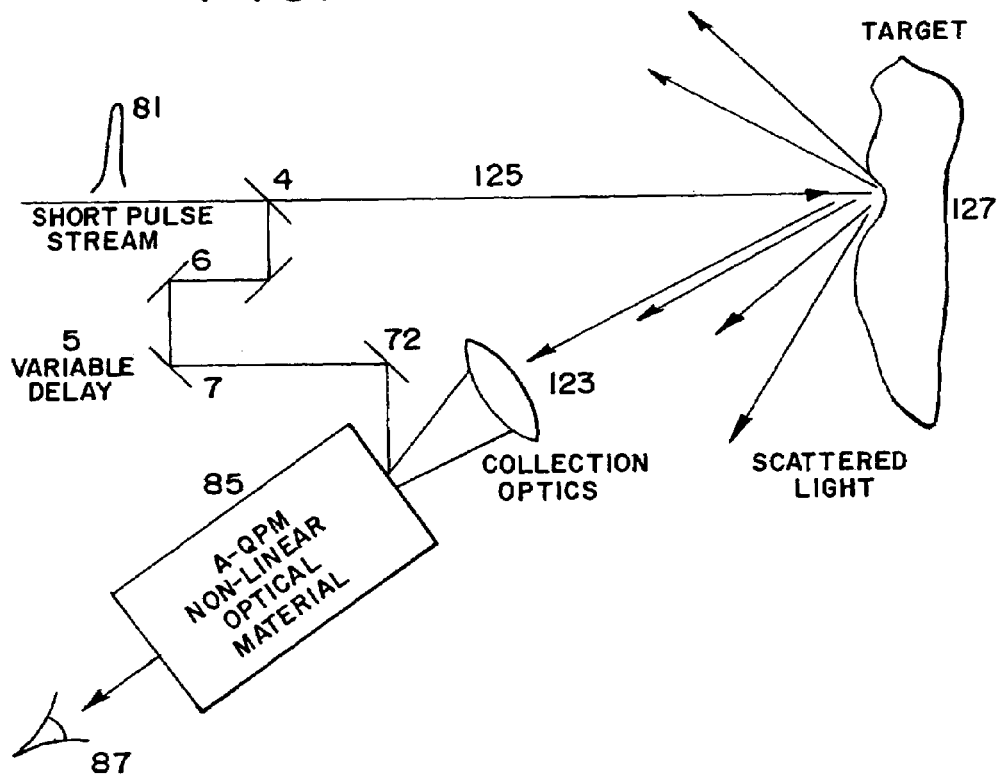

FIG.12
AFTER KURZ, HUANG, SAIDA, AND FEJER
OPT. LETT. 29,551(2004)
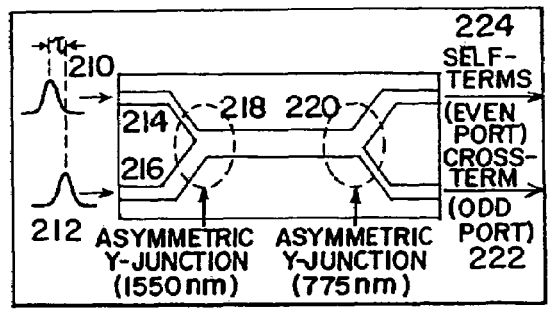
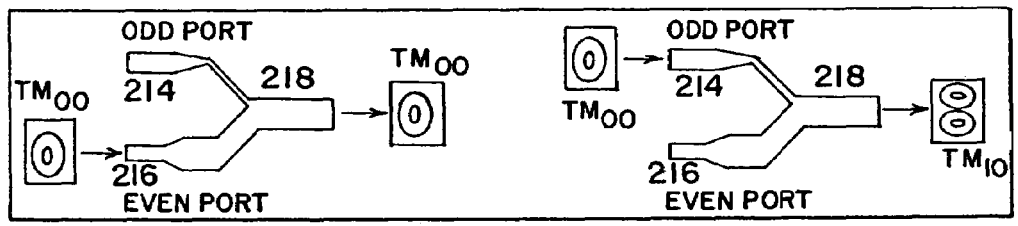
FIG.13
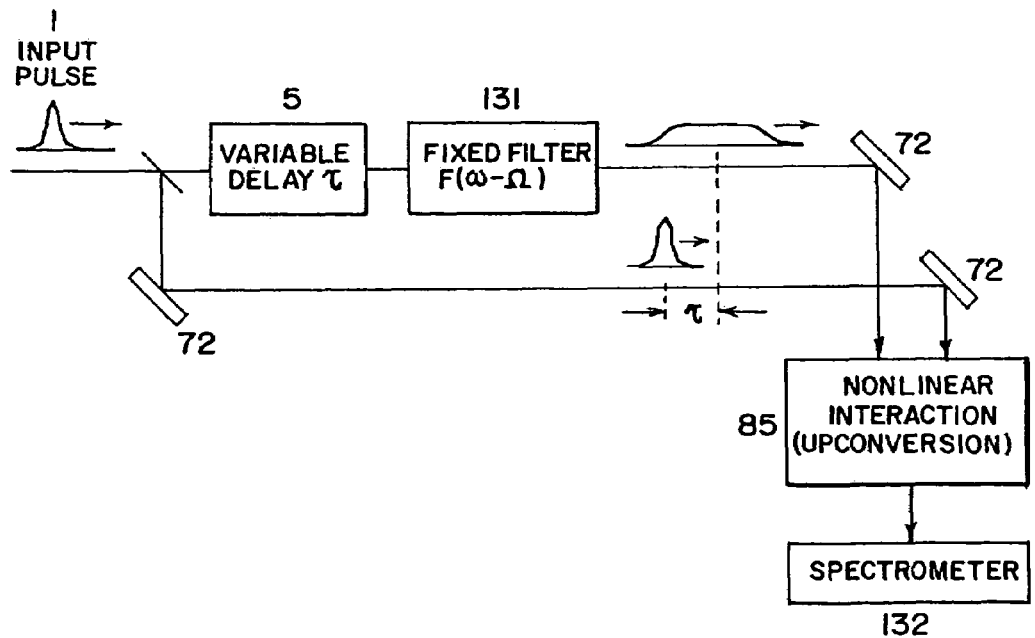

ULTRASHORT PHOTONIC WAVEFORM MEASUREMENT USING QUASI-PHASE-MATCHED NON-LINEAR OPTICS

This application claims the benefit of priority to U.S. provisional application No. 60/590,284, which was filed on Jul. 21, 2004 and which is incorporated herein by reference.

TECHNICAL FIELD

An aspect of the application may have relevance to the measurement and detection of ultra-short optical pulses or other optical signals.

BACKGROUND

Measurement techniques for ultra-short optical pulses in the picosecond and femtosecond range typically involve all-optical methods, most commonly based on the second harmonic generation (SHG) optical nonlinearity. For many applications, such as measurement of low power signals in lightwave communications, it is desirable to reduce the power required to characterize the pulse. Simultaneously, the measurement must provide sufficient optical bandwidth to avoid measurement distortion. Usually optical bandwidth is increased by decreasing the length of the nonlinear crystal responsible for the SHG. However, this reduces the efficiency of the nonlinear optical interaction and leads to increased power requirements. The result is that there is a trade-off between optical bandwidth and measurement sensitivity; increasing the optical bandwidth to avoid measurement distortion leads to an undesirable decrease in measurement sensitivity.

Phase matching between the fundamental and second harmonic signals is required in order to obtain the highest efficiency for SHG. However, due to the phase velocity difference between the input wave and the generated second harmonic wave, phase matching does not usually occur naturally. Microstructuring of the medium may be employed to achieve phase matching between the input signal and the harmonic wave.

For continuous-wave (narrow bandwidth) input signals, the microstructuring can take the form of a periodic patterning of the nonlinear optical susceptibility. A material that may be fabricated to employ such periodic patterning of the nonlinear susceptibility is periodically poled lithium niobate (PPLN), in which the orientation direction of crystal domains is periodically modulated, typically along the interaction direction, during the fabrication process. The optical bandwidth for second harmonic generation, formally known as the phase matching bandwidth, is inversely proportional to the length of the nonlinear crystal, both in the case of a uniform crystal and in the case of a quasi-phase-matched crystal with periodic microstructuring.

Several studies investigating quasi-phase-matching (QPM) via nonperiodic microstructuring of the nonlinear medium have also been reported including lithium niobate crystals where the poling period varies along the length of the crystal. Such crystals are referred to as aperiodically poled lithium niobate (A-PPLN). The modulation of the quasi-phase-matching or poling period broadens the phase matching bandwidth for SHG and the optical bandwidth can be chosen largely independently of the crystal length, which is not the case with uniform or periodically poled nonlinear crystals.

In addition, the efficiency of the SHG process can be increased by increasing the nonlinear crystal length. For the case of a continuous-wave (narrowband) laser tuned for perfect phase matching, the efficiency can increase with the square of the crystal length. For sufficiently short pulse (broadband) lasers, the efficiency increases in proportion to the crystal length.

To obtain accurate results in autocorrelation, frequency resolved optical gating (FROG), and other ultrashort pulse measurement techniques based on SHG, the phase matching bandwidth for SHG should exceed the optical bandwidth of the signal of interest. This condition is usually met by reducing the length of the nonlinear crystal. If the crystal length is reduced by N, the phase matching bandwidth is increased by N; however the peak efficiency drops by $N^2$, which means that there is a large cost in sensitivity.

In second-order nonlinear optics, e.g., second harmonic generation (SHG), material dispersion causes the phase between the input signal electric field and the electric field at the newly generated frequency to drift with distance along the crystal, preventing continuous growth of the newly generated field. The distance over which the accumulated phase difference between the second harmonic and the driving polarizations changes by $\pi$ is called the coherence length $l_c$. In QPM, continuous growth of the generated field along the propagation direction is achieved by resetting the phase of the driving polarization every coherence length by changing the sign of the nonlinear coefficient $\chi$. In the Fourier domain (wave-vector space), QPM is equivalent to compensating the wave-vector difference between the nonlinear polarization and the second harmonic field wave by applying a Fourier component of a grating with appropriate period $\Lambda_g = 2l_c$.

In ferroelectric materials, such as lithium niobate, the sign of the second order nonlinearity is related to the crystal orientation; alternation of the sign of the nonlinearity, and hence QPM, is achieved by periodic poling. A method of periodic poling consists of applying a periodic electric field pattern on the ferroelectric wafer through a dielectric mask causing reversal of the domain orientation under the surface of the electrodes. The periodic crystal orientation remains permanently after removal of the poling field. A dielectric mask may be prepared lithographically which leads to high resolution as well as precise positioning.

SUMMARY

This application describes the use of quasi-phase-matched (QPM) nonlinear materials, in which the nonlinear medium may be a periodically microstructured to achieve phase matching (A-QPM) between the input optical wave and the generated second-harmonic wave in measurement and detection techniques which employ a non-linear interaction between signal waveforms. As a result of A-QPM, the nonlinear crystal may be chosen as long as possible, limited only by manufacturability considerations. The QPM period of the nonlinear material may be designed with a modulation that is appropriate to provide the desired optical bandwidth. In this way the optical bandwidth may be tailored independently of the length, to simultaneously achieve high optical bandwidth and high nonlinear efficiency.

In one example, the use of A-QPM nonlinear optical media, whether in bulk or waveguide form, may be used to achieve high sensitivity and fidelity in the measurement of ultra-short optical pulses, when combined with measurement or detection techniques that incorporate an operation requiring non-linear interaction between the signal and a replica or modification thereof, or between two or more signals.

By way of example, and not limitation, types of optical pulse measurement and detection techniques that can be implemented using SHG configurations include the following: intensity autocorrelation, which provides indirect information about ultrashort pulse shapes, such as an estimate of pulse duration; intensity cross-correlation, also known as optical sampling: using a short reference pulse, this technique provides a measurement of the temporal intensity profile of the waveform; frequency-resolved optical gating (FROG): the technique permitting full characterization of the intensity and phase profiles of an ultrashort pulse; spectrally and temporally resolved upconversion (STRUT): the technique permitting full intensity and phase characterization of ultrashort pulses; spectral phase interferometry for direct electric field reconstruction (SPIDER): another technique permitting full intensity and phase characterization of ultrashort pulses; optical ranging; and, optical performance monitoring.

The nonlinear interaction may be performed either in a noncollinear geometry (for example, with bulk nonlinear media or in planar waveguide geometries) or in a collinear geometry (for example, with bulk nonlinear media, planar waveguide nonlinear devices, and channel waveguide nonlinear devices). Waveguide geometries, especially the channel waveguide geometry, may have an advantage of the high gain in nonlinear conversion efficiency. A collinear geometry may also be favorable for the high conversion efficiency. Alternatively, the bulk medium and planar waveguide geometries offer the possibility of using a non-collinear geometry. The non-collinear geometry may, for example, be used in the FROG and SPIDER measurement technique.

In another aspect, the polarization sensitivity of second-order nonlinear processes using aperiodic QPM nonlinear media may be mitigated. A polarization scrambler prior to the nonlinear interaction may be used to vary the optical polarization on a time scale much faster than the data acquisition time but slower than the inter-pulse interval of the individual pulses in the pulse train. In some applications, a Lyot depolarizer may also be used. These approaches overcome a polarization sensitivity of the second order nonlinearity. By using a polarization scrambler (or depolarizer), any input polarization, before the scrambler, should give the same average measurement output strength, with only a modest reduction in measurement sensitivity, compared to the best case sensitivity for the optimum input polarization without scrambler.

The A-QPM SHG approach may be utilized for the optical portion of the signal processing in any circumstance where a non-linear, particularly second-order, interaction between components of an input optical signal or between multiple input optical signals is a part of the measurement or detection process.

BRIEF DESCRIPTION OF THE DRAWINGS

FIG. 10 shows a schematic representation of an apparatus for performing self-referenced spectral-shearing interferometry (SPIDER);

FIG. 11 shows the use of an optical sampling technique to perform optical ranging;

FIG. 12 illustrates the use of an asymmetric Y-junction to perform mode sorting; and, FIG. 13 shows a schematic representation of an apparatus for performing spectrally and temporally resolved up-conversion.

DETAILED DESCRIPTION

Exemplary embodiments may be better understood with reference to the drawings, but these examples are not intended to be of a limiting nature. Like numbered elements in the same or different drawings perform equivalent functions.

In an example, an optical intensity auto-correlator using an A-QPM SHG crystal or other non-linear optical material may be used to characterize an ultra-short optical pulse. Materials such as lithium tantalate, potassium niobate, gallium arsenide, and other non-linear optical materials which can be microstructured, may be used. The use of the term A-QPM crystal is not intended to limit the nature of the material used for this purpose, and serves as a proxy for other materials achieving a comparable effect.

Figure 1:
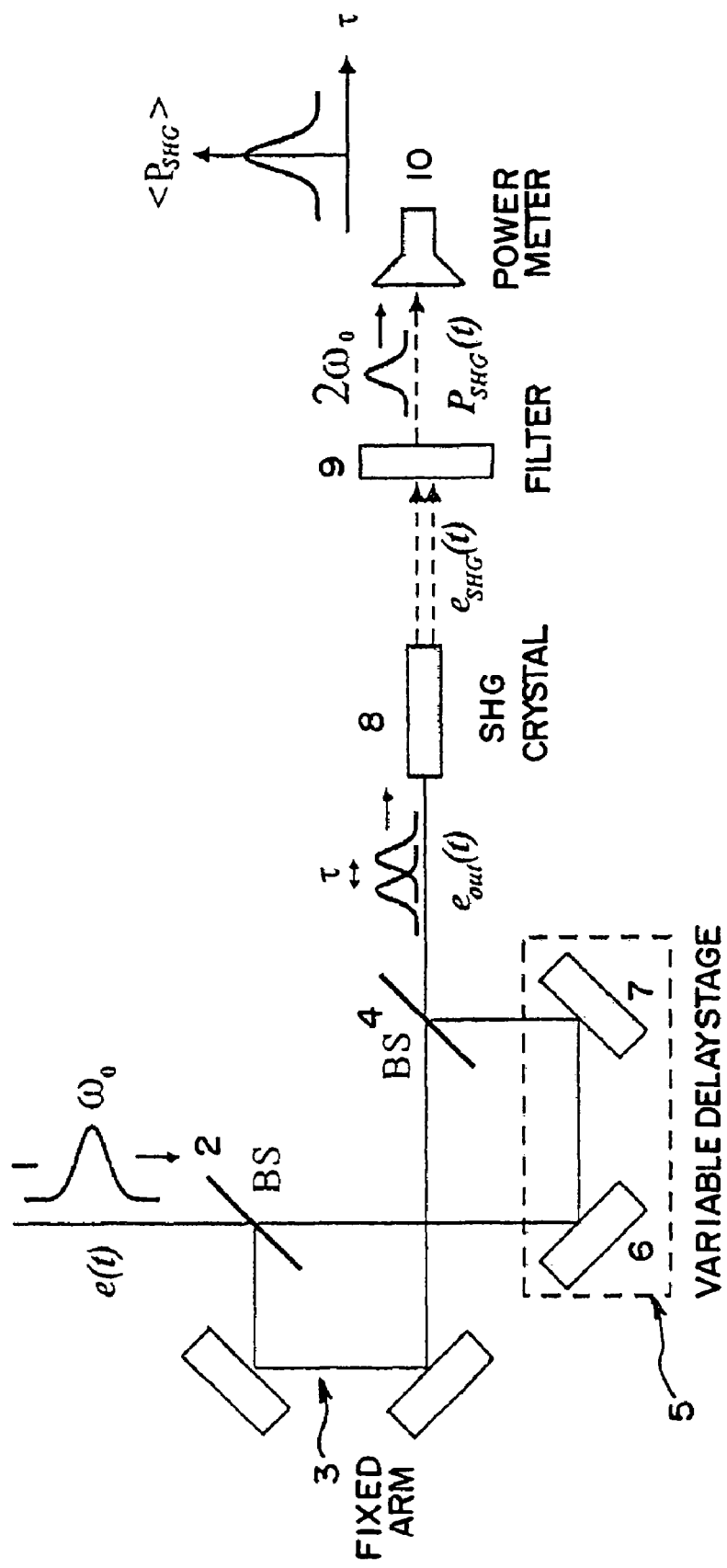
FIG. 1 shows a schematic representation of an optical intensity autocorrelation apparatus employing a A-QPM SHG crystal.

Optical intensity autocorrelation replicates the traditional computational autocorrelation function with some of the operations performed in the optical domain, and is able to process signals of wide optical bandwidth. A simplified version of the auto-correlator is shown in FIG. 1.

As shown, an optical pulse signal 1 at a frequency $\omega_o$ is incident on a beamsplitter 2, which divides the optical pulse signal 1 into two portions. A first portion is directed to a fixed optical delay 3 which is comprised of two mirrors oriented such that they direct the first portion onto a second beamsplitter 4. The second portion is incident on a variable-delay stage 5, comprised of mirrors 6 and 7, oriented such the second portion is directed to impinge on the second beamsplitter 4 in a direction orthogonal to the first portion. The effect of the second beamsplitter 4 is to redirect a portion of the second potion such that it is collinear with the first potion and such that portions of the first and second portions are directed towards a proximal end of an A-QPM SHG crystal 8. The mirrors 6 and 7 of the variable delay stage 5 may be adjusted with respect to the first beamsplitter 2 and the second beamsplitter 4 such that the differential time delay of the path of the first portion and the second portion may be varied. This creates two pulses from the single input signal 1, the two pulses having a time difference of $\tau$ therebetween. Optical energy from the first and second portions passes through the SHG crystal 8 and non-linear interaction occurs in accordance with the second-order transfer function of the crystal.

Amongst the signals which are present at the distal end of the A-QPM SHG crystal 8 is a portion having a frequency of $2\omega_o$. An optical filter 9 is disposed at the distal end of the SHG crystal 8, which passes energy in the frequency regime of $2\omega_o$, and absorbs or reflects energy at other frequencies, particularly at $\omega_o$. The output of the optical filter 9 is directed onto a power optical detector 10, which may be any optical detection means such as a photomultiplier tube, semiconductor detector, or the like. It will be understood that this is an optical realization of portions of the autocorrelation process, and the output power 11 is proportional to the value of the autocorrelation function at a lag τ. The technique is usable to measure pulse durations which may too short for conventional means, and can also be used to measure any signal of bandwidth less than or equal to approximately the QPM phase-matched (PM) bandwidth. Although various examples are described as acting on a pulse signal, any signal waveform within the QPM passband may be processed.

An example of the use of the intensity autocorrelation technique is presented. The waveguide sample used in the experiment described is made by electric field poling and annealed proton exchange in a z-cut lithium niobate substrate. The largest nonlinear tensor component of lithium niobate ($d_{33}$=27 pm/V) may be exploited for SHG by coupling a z-polarized beam into the waveguide, which supports a single TM (z-polarized) mode. The poling region of the waveguides was 5.95-cm-long, and results in a 22-ps group velocity walk off due to group velocity mismatch (GVM) (GVM in waveguides is 0.37 ps/mm).

Figure 2A:
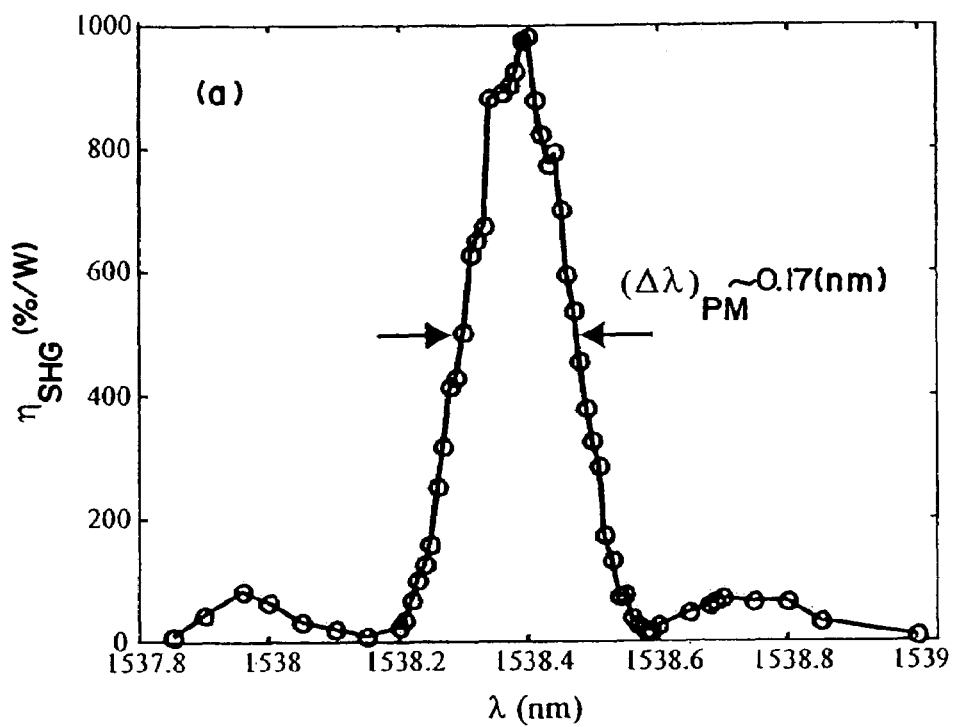
FIG. 2(a) shows the results of measurement the bandwidth of a conventional lithium niobate crystal and, FIG. 2(b) shows the results of measurement of the bandwidth of a A-QPM lithium niobate crystal.
Figure 2B:
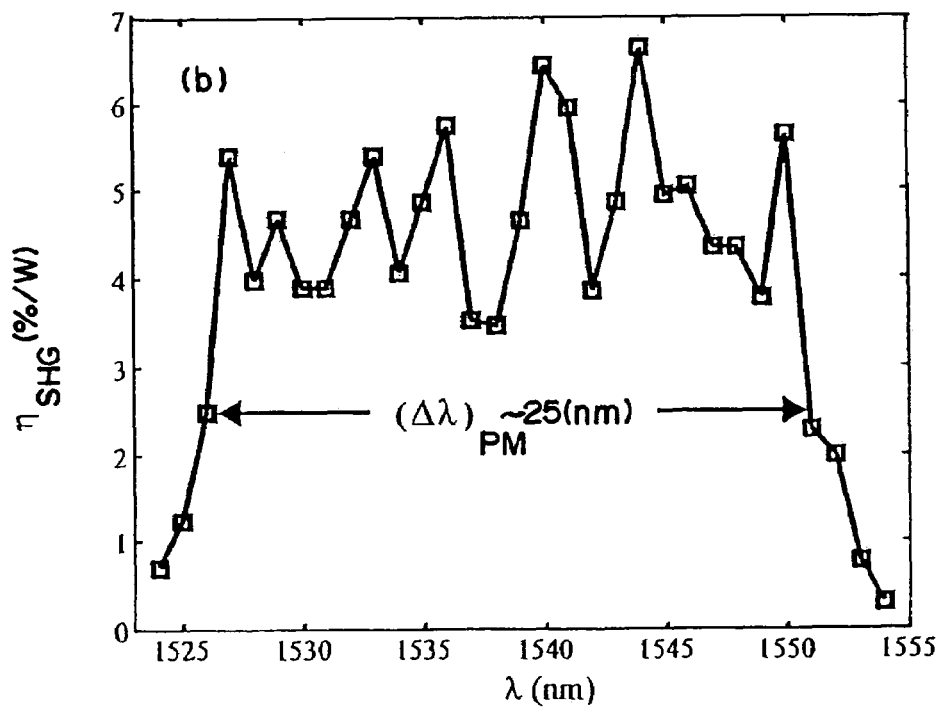

A tunable CW laser was used to characterize the SHG transfer function for an unchirped PPLN waveguide which was determined to have a 0.17-nm SHG BW (FIG. 2*a*), which is consistent with the value implied by the group velocity walk off. Measurements of sub-picosecond pulses with such a waveguide would be subject to serious distortion. An A-PPLN waveguide was fabricated on the same lithium niobate sample with a SHG QPM BW of 25 nm, and characterized in the same manner, and the results are shown in FIG. 2*b*. A waveguide with the QPM BW illustrated should be sufficient to accurately characterize bandwidth-limited pulses of approximately 100 fs duration. Comparing the two SHG spectra in FIG. 2 indicates that chirping the poling period reduces the SHG spectral peak height but leaves the area under the spectrum approximately unchanged. It should be possible to reduce the ripple in the broadened PM curve shown in FIG. 2*b* by longitudinally apodizing the strength of the QPM grating. Nevertheless, autocorrelation measurements are expected to be only weakly sensitive to such ripple.

Figure 3:
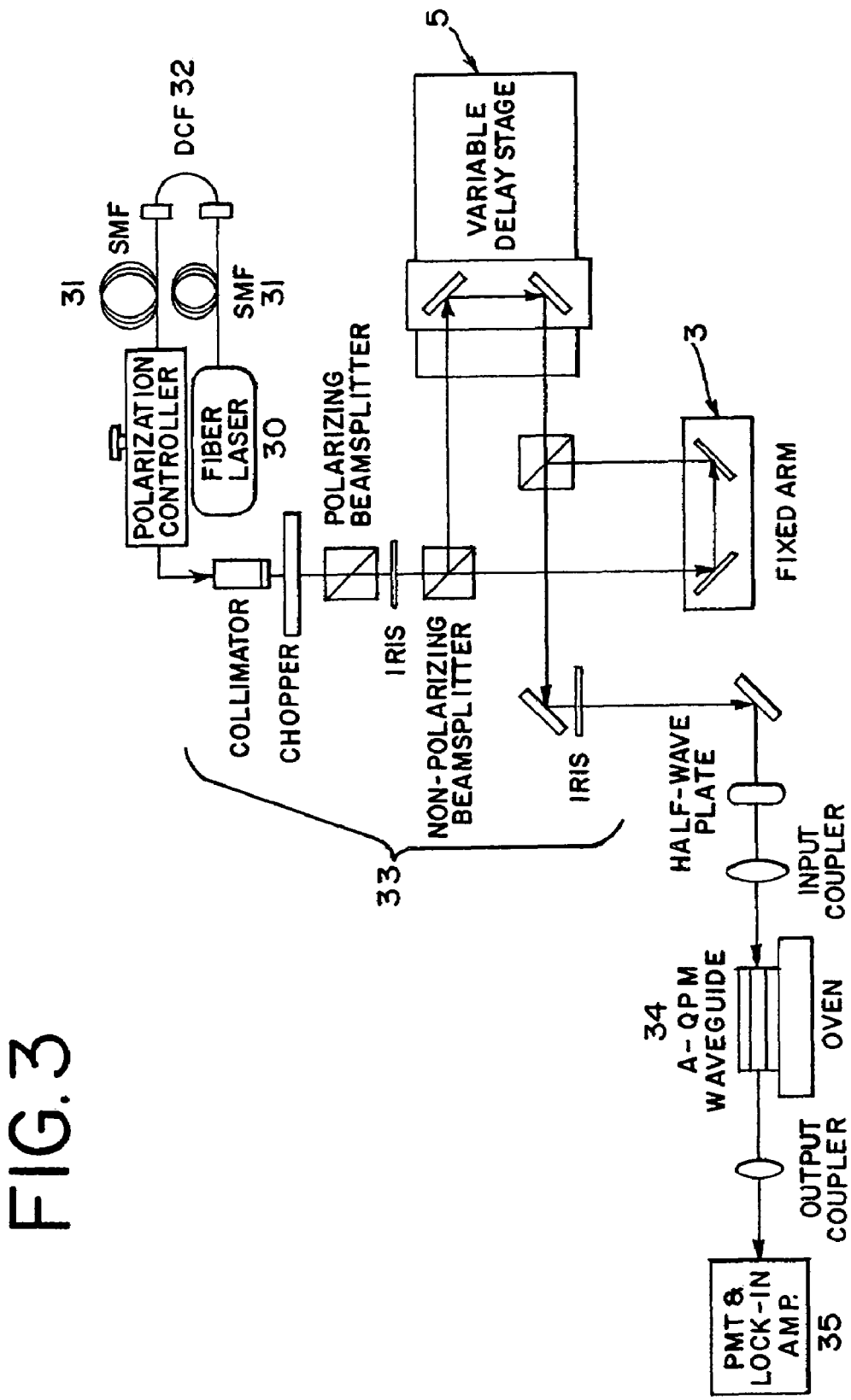
FIG. 3 shows an experimental intensity autocorrelation apparatus.

The experimental configuration shown in FIG. 3 is an example of a more sensitive version of the apparatus of FIG. 1 and uses a mode-locked fiber laser 30 which generated pulses of approximately 220-fs duration, with a 50 MHz repetition rate, 1545 nm central wavelength, and approximately 13-nm spectral width. The pulses are transmitted through single mode fibers 31 and a dispersion compensated fiber 32 link into a collinear-type interferometer 33, and then coupled into the A-QPM SHG waveguide 34. The A-QPM SHG waveguide 34 is heated to 84° C. to shift the central SHG PM wavelength from the 1538-nm room temperature value to a wavelength of 1545 nm. The output second-harmonic signal is detected by a photomultiplier tube along with a lock-in 35 amplifier and manipulated in software to yield background-free autocorrelation curves.

Figure 4:
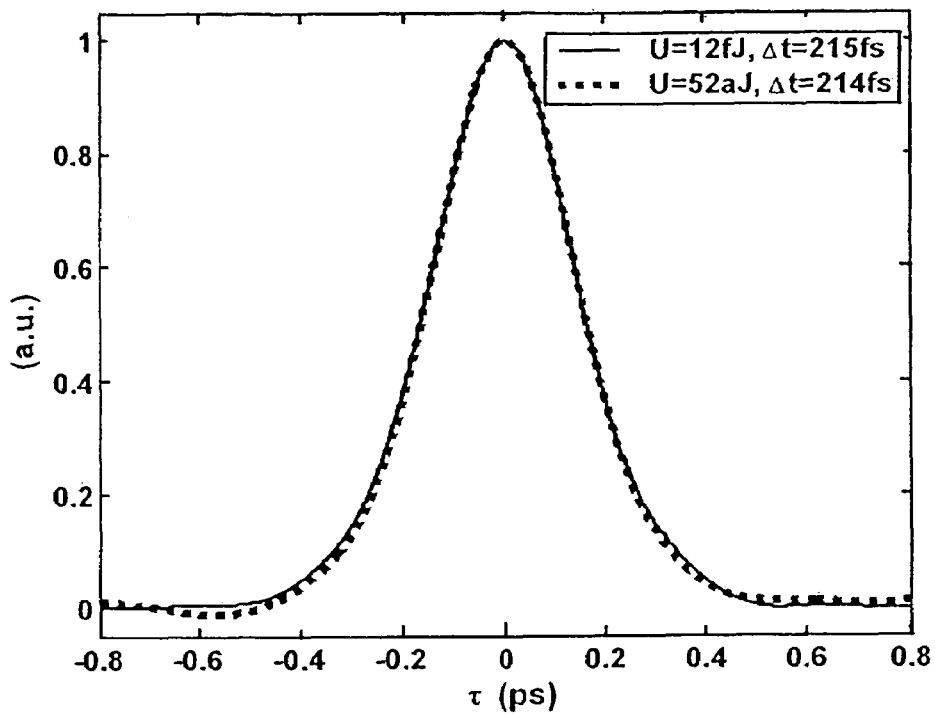
FIG. 4 shows the results of intensity autocorrelation performed with the apparatus illustrated in FIG. 3.
Figure 5:
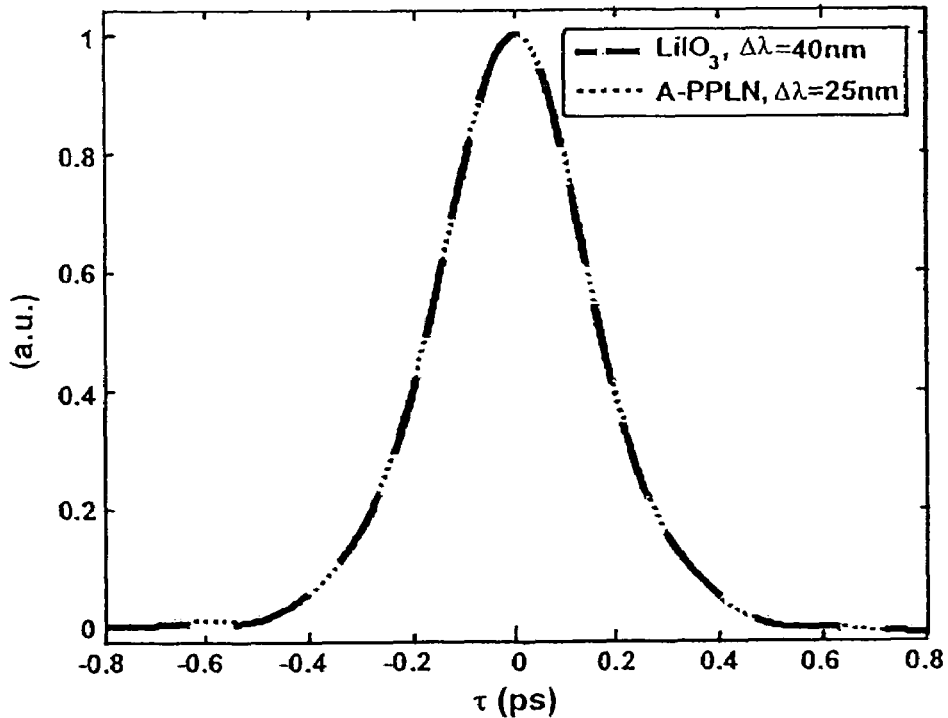
FIG. 5 shows the results of intensity autocorrelation performed in a bulk crystal.

FIG. 4 illustrates two autocorrelation traces obtained using a chirped A-QPM waveguide with 25-nm SHG BW. The energies per pulse coupled into the waveguide (referring to the total energy from both autocorrelator arms) are 12 fJ (solid) and 52 aJ (dotted), respectively. The latter corresponds to 400-photons per pulse, 0.24-mW peak power, and 1.3-nW average power. This corresponds to a measurement sensitivity of $3.2 \times 10^{-7}$ mW2. Even with a 23-dB input power difference, these two curves agree extremely well. The de-convolved pulse durations (assuming a sech-profile) are essentially identical: 215 fs and 214 fs, respectively. To confirm the accuracy of the measurements, autocorrelation measurements were also performed using a standard bulk nonlinear crystal: a 1-mm-thick lithium iodate (LiIO3) crystal with 88-fs group velocity walk off and 40-nm SHG BW. Since the temporal walk off is less than the input pulse duration, the resulting trace should have negligible distortion. FIG. 5 compares autocorrelation traces derived by the bulk LiIO3 (dashed) and the 25-nm BW A-QPM waveguide (dotted). There is no noticeable difference between the traces even though the A-QPM waveguide has an high group velocity walk off (22 ps).

The chirped A-QPM waveguides retain almost the same efficiency as the un-chirped PPLN guide.

For an input pulse with complex spectral amplitude $A_{\omega_0}(\omega)$, the output second-harmonic pulse has a complex spectral amplitude of:

$$A_{2\omega_0}(\omega) = P_{NL}(\omega) \cdot H(\omega) \tag{1}$$

where $P_{NL}(\omega) \propto A_{\omega_0}(\omega) \otimes A_{\omega_0}(\omega)$ represents the nonlinear polarization spectrum derived by the autoconvolution of the input field spectrum, and $H(\omega)$ is the complex SHG PM spectrum of the nonlinear crystal. In autocorrelation measurements, the detector measures the second-harmonic pulse energy, which involves a spectral integration:

$$U_{2\omega_0} \propto \int_{-\infty}^{\infty} |A_{2\omega_0}(\omega)|^2 d\omega = \int_{-\infty}^{\infty} |P_{NL}(\omega)|^2 \cdot |H(\omega)|^2 d\omega \tag{2}$$

Figure 6:
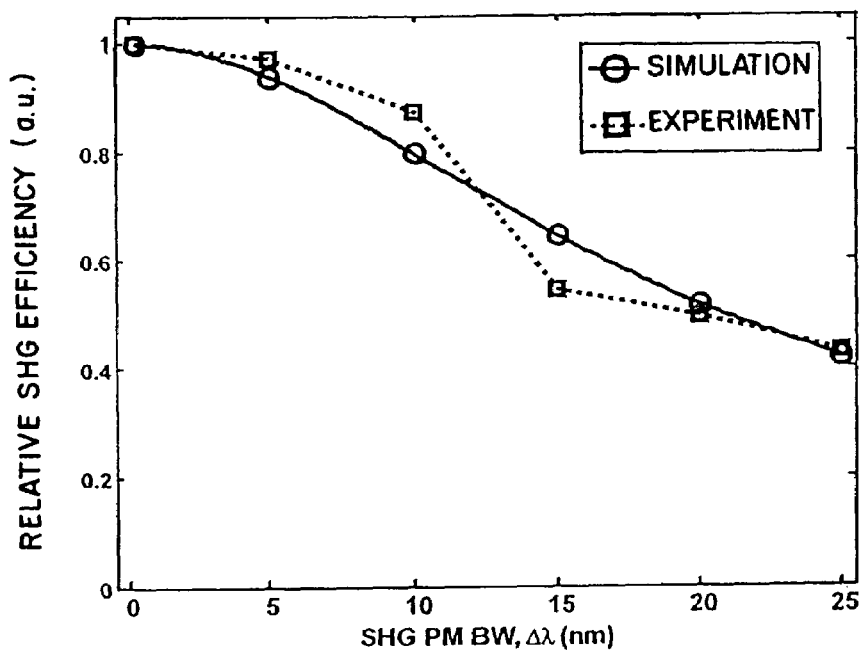
FIG. 6 compares theoretical and measured conversion efficiencies.

If the nonlinear polarization power spectrum $|P_{NL}(\omega)|^2$ is constant, the output signal $U_{2\omega_0}$ is proportional to the area under the SHG PM power spectrum $|H(\omega)|^2$. As indicated previously, chirping the poling period appreciably does not change this area; therefore $U_{2\omega_0}$ is substantially independent of the SHG BW broadening of the A-QPM waveguides. In practice, the output signal strength may decrease slowly with the SHG BW broadening due to the gradual roll-off of $|P_{NL}(\omega)|^2$. However, this efficiency degradation may remain weak, provided that the SHG BW is not made significantly broader than the input spectral width. For example, with a 10-nm SHG BW (which is sufficient to accurately measure the 220 fs pulses), the SHG efficiency is still approximately 80% as compared to an unchirped PPLN waveguide, although the bandwidth is broadened by approximately 60 times. Even with further broadening of the SHG BW to 25 nm (which is about twice that of input spectral FWHM and about 150 times wider than the PPLN counterpart), a relative SHG efficiency of approximately 40% is retained as shown in FIG. 6. This trend agrees with simulations for the SHG of bandwidth-limited pulses with the same power spectrum as our input pulses.

Figure 7:
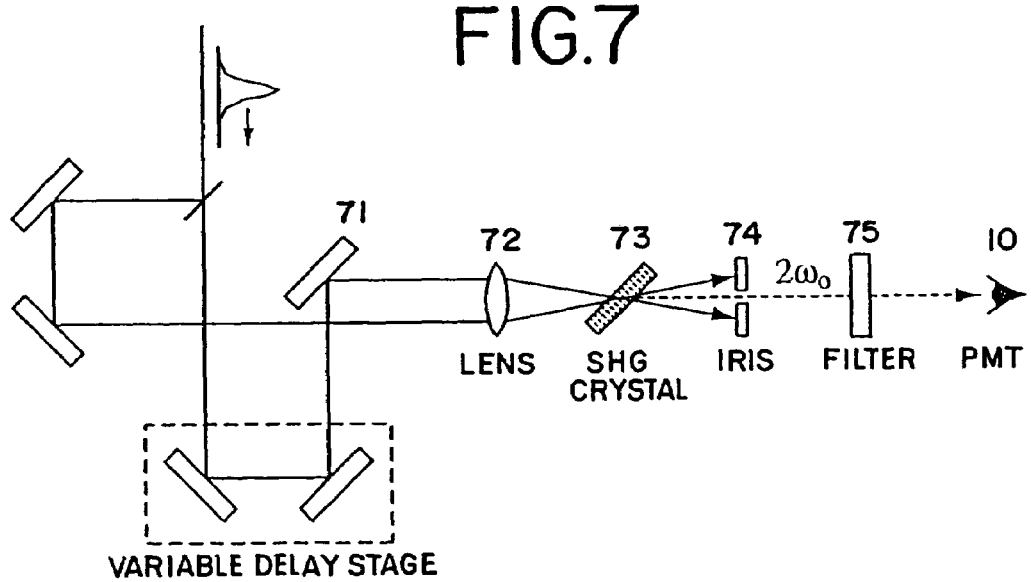
FIG. 7 shows a schematic representation of an apparatus for non-collinear second harmonic generation geometry.

An intensity autocorrelation apparatus has been shown for a collinear arrangement, but it is also possible to perform the function in a non-collinear configuration. FIG. 7 shows a non-collinear arrangement. A difference between the non-collinear configuration and the configuration shown in the first example is that the there may not be a second beamsplitter, and a mirror 71 is disposed such that it does not render the first beam portion and the second beam portion collinear. Both beam portions are directed to a lens 72 which images the two portions onto an A-QPM SHG crystal 73. The output from the A-QPM SHG crystal 73 passes through an iris 74 and a filter 75 to select the second harmonic signal prior to impinging on the power meter 10.

electric-field reconstruction (SPIDER). SHG spectral broadening through chirping may also be advantageous for optical performance monitoring in a WDM lightwave system environment.

Figure 8:
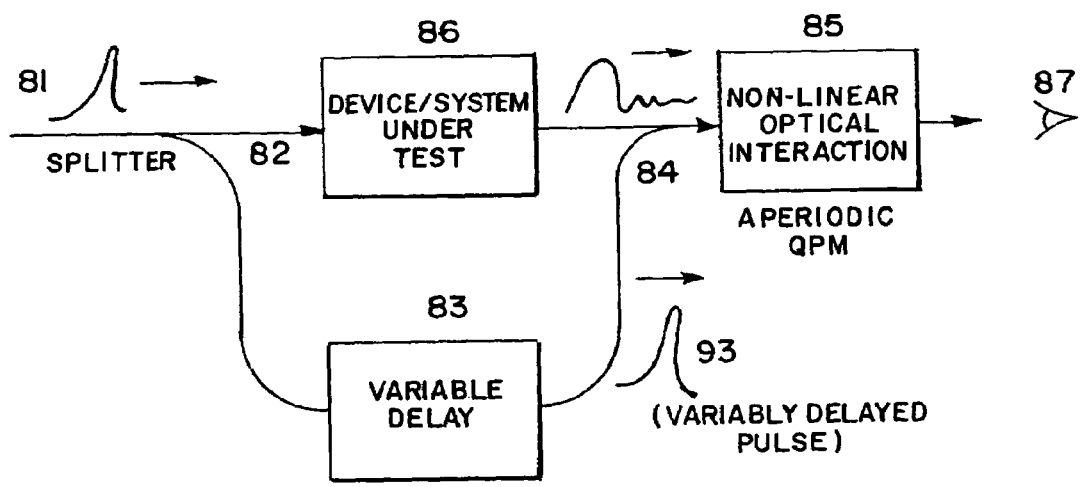
FIG. 8 shows a schematic representation of an apparatus for intensity cross-correlation.

In another example, optical intensity cross-correlation can be performed. FIG. 8 is a representation of such an apparatus. A sampling pulse waveform 81 is divided into two portions, by a beamsplitter, a fiber directional coupler 82, or the like, and the first portion is directed into a variable delay unit 83, which may be similar to that shown as element 5 in FIG. 1. The variably delayed pulse output from the variable delay unit 83 is directed to a beamsplitter or directional coupler 84, whose output is directed towards the proximal end of a non-linear A-QPM optical device 85. The second portion of the sampling pulse waveform 81 is directed to the input of a device or system 86 which whose optical properties may be of interest. The optical output of the device or system 86 is directed toward the beamsplitter or directional coupler 84 and thence to the input of the non-linear optical device 85.

Insertion of the device or system 86 modifies the characteristics of the sampling pulse waveform in accordance with the transfer function of the system or device 86. In general, the amplitude and phase of the frequency components of the signal will be modified by passage through the device 86. At the input to the non-linear device 85, the output of the device 86 and the variable delay 83 waveforms constitute a sampling pulse and the sampling pulse as modified by the device or system 86. Since the portion of sampling pulse output from the variable delay unit 83 has a time delay $\tau$ which may be varied with respect to the output of the device 86, the interaction of the two pulses within the non-linear optical device 85 constitutes the optical equivalent of intensity cross-correlation, when the signal output from the distal end of the non-linear device 85 is filtered (filter not shown) such that only signal components in the domain of the second harmonic $2\omega_0$ of the input signal are applied to the optical detector 87. The variation of time delay in the variable delay stage 5 permits the determination of the intensity cross-correlation function as a function of the time delay offset $\tau$ between the two signal portions.

Figure 9:
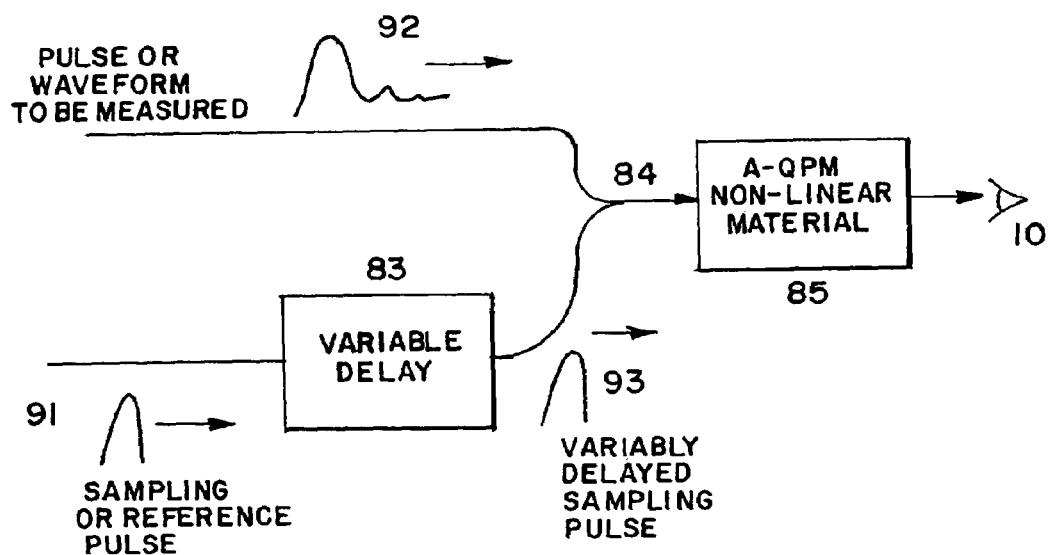
FIG. 9 shows a schematic representation of an apparatus for pulse sampling.

In yet another example, optical sampling using short optical pulses may be performed, using the configuration shown in FIG. 9. The sampling pulse waveform 91 is applied to a variable delay unit 83, which is similar to that shown as element 5 in FIG. 1. The signal 92 to be sampled is combined with the variably delayed sampling pulse 88 in a beamsplitter or directional coupler 84 and applied to the proximal end of the non-linear A-QPM optical device 85. The sampling pulse 91 and the signal 92 to be sampled may be derived from separate optical sources. Where the pulse rates of the two sources are synchronized, the variable delay element 83 is used to vary the relative time relationship of the sampling (or reference) pulse and the pulse or waveform to be measured.

Alternatively, sampling pulse 91 may be unsynchronized with the waveform to be measured 92 and have a repetition rate which differs from that of the signal to be measured 92. In such a circumstance, the relative time delay between the sampling pulse 91 and the signal to be sampled is time varying and the variable delay unit 83 may be omitted. The sampling pulse 91 and the signal to be sampled 92, having been combined in the beamsplitter of directional coupler 84 and applied to the proximal end of the A-QPM non-linear optical device 85, interact in a non-linear manner as previously described, and at least one of the output signal components is at the second harmonic $2\omega_0$ of the input signals. The output signal is filtered as previously described and applied to the photodetector 10. Since the sampling pulse 91 and the signal to be measured 92 may be derived from separate optical sources, their optical center frequencies may be different. The output of the non-linear device at the nominal second harmonic frequency may differ from the nominal second harmonic frequency corresponding to signal to be measured by the difference in fundamental frequencies of the two optical sources 91 and 92. So long as the energy of the two signals 91 and 92 is within the QPM bandwidth, efficient SHG conversion will occur, and since only the intensity of the resultant signal is being measured, the difference in frequency may not be of significance. Alternatively, the difference frequencies may be measured using optical or electronic techniques that are known in the art.

Use of two separate optical sources, with asynchronous repetition rates, may be advantageous as it permits the omission of a variable delay unit. The A-QPM characteristics of the SHG material may be chosen based on the expected bandwidth of the signals to be processed.

In another example, a layout for SPIDER (spectral phase interferometry for direct electric field reconstruction) is shown in FIG. 10. SPIDER is a self-referencing technique based on the interference between two spectrally and temporally shifted (but otherwise identical) versions of the pulse to be measured.

The pulse to be measured 101, with spectrum $A(\omega)$, is split into two portions by a beamsplitter or direction coupler 82. The first portion is transformed into a pulse doublet with a differential delay $\tau$, e.g., by passing through a Michelson interferometer or an arrangement similar to shown in FIG. 1. The differential delay between the optical path beamsplitters 2, 4 passing through the fixed delay path 3 and the path having a variable geometry 5 results in a differential pulse pair 114. The second portion passes through a pulse stretcher 110, which broadens the pulse and gives it a chirp (that is, a frequency which is time dependent). The pulse pair and chirped pulse 116 then interact in an A-QPM SHG crystal 112. Each pulse in the pulse pair 114 interacts with a different frequency from the chirped pulse 116, as the frequency content of the chirped pulse 116 is a function of time within the pulse. The operation of the nonlinear crystal 112 results in a pair of upconverted pulses 118, still separated by a time delay $\tau$ but with a spectral "shear", or frequency difference $\Omega$. The upconverted power spectrum is measured using a spectrometer 120.

The output power spectrum is of the form, $$|A_{out}(\omega)|^2 \sim |A(\omega)|^2 + |A(\omega-\Omega)|^2 + |A(\omega)||A(\omega-\Omega)|\cos[\omega\tau + \psi(\omega) - \psi(\omega-\Omega)] \qquad (3)$$

and the data yield the difference in the spectral phase $\psi$ for frequencies separated by the spectral shear $\Omega$, which is sufficient for waveform retrieval. Phase and amplitude reconstruction of low-power lightwave signals would benefit adaptable schemes for compensation of chromatic and polarization-mode dispersion (PMD), where the PMD may arise from small random birefringences distributed along the length of fibers or other mechanisms.

In still another example, an apparatus may be configured to perform optical ranging with ultra-short pulses. As shown in FIG. 11, a short optical pulse 81 is input to a beamsplitter 4, creating two signal portions. A first signal portion 125 is directed towards an object 127 to be measured, and a portion of the first light portion is reflected or scattered from the surface. The reflected or scattered optical signal is collected by a lens 123 and focused on a non-linear A-QPM material 85. The second signal portion 126 is directed into a variable time delay unit 5, comprising two mirrors 6 and 7 each disposed at an angle with respect to the light path, such that the distance between the mirrors 6, 7 and the beamsplitter 4 and the mirror 72 may be varied. The mirror 72 directs this second signal portion onto the non-linear A-QPM material 85 such that it interacts with the first signal portion collected by lens 123. The output of the non-linear A-QPM material 85 is detected by an optical detector 87. The distance or range to the target 127 may be determined by observing the time delay of the variable time delay 5 that results in a signal maximum. By ranging as a function of the transverse location of the target being illuminated (range-resolved imaging) the surface depth profile of the target 127 can be determined. For example, a 1 ps change in time delay is equivalent to 0.15 mm of target displacement. As the optical bandwidth to achieve this temporal resolution is large, a QPM non-linear material may be desirable to achieve the desired bandwidth and sensitivity.

In another aspect, a non-linear A-QPM optical material may be used for optical system performance monitoring. An aspect involves characterizing chromatic dispersion, where such dispersion in an optical system may lead to pulse spreading, with consequent peak intensity reduction. This can degrade the operation of lightwave data transmission links. If a system performance monitoring device is available, then the transmission link may be configured to correct signal distortion or to provide feedback to the optical system to adjust operating parameters.

The performance monitoring apparatus can be configured to measure two or more time lag samples of the intensity autocorrelation, which provides information on the pulse duration. In another aspect, the input optical signal may be split into two replicas, which are then each subjected to a known amount of additional dispersion but with different sign. Each signal is then input into, for example, an autocorrelator, and a comparison of the outputs provides information on the dispersion of the input optical signal. In yet another aspect, a single input optical signal is used but, both the autocorrelator signal and the power at the input frequency before the autocorrelator are measured. A simplified apparatus may omit the variable lag value and determine the auto-correlation function at zero lag. The ratio of the autocorrelation function to the input power at the input frequency is inversely proportional to pulsewidth, and yields information on pulse broadening and dispersion.

Measurement of the output power at the second harmonic frequency allows performance monitoring in any of the modes discussed above. For example, a single input signal to be monitored is input into a single SHG crystal; the output second harmonic power is measured and compared to a measurement of the input power at the original frequency. Increasing the sensitivity of the measurement using a long crystal without A-QPM results in a reduction in bandwidth. However, if an A-QPM material is used for SHG, then a suitable bandwidth may be achieved.

Configurations using non-linear A-QPM materials may be constructed or assembled with either collinear or non-collinear geometries. Non-collinear geometries may be arranged such that self-mixing products and the fundamental frequencies do not impinge on the detector, while the cross-mixing products impinge on the detector. This may reduce the background signal intensity. In addition to bulk optics realizations of the non-colinear geometries, equivalent results may be obtained by using mode sorting with waveguide asymmetric Y-junctions, a known technique whose principle is illustrated in FIG. 12. The two input signals 210, 212 are coupled into two different input waveguides 214 and 216, respectively, with different physical dimensions, which then come together in an asymmetric Y-junction 218. This allows the two signals 210, 212 to propagate as different spatial waveguide modes, and the generated second harmonic light has a different spatial symmetry for the cross-terms with respect to the self-terms. The different spatial symmetry allows another asymmetric Y-junction at the output 220 to couple the cross-terms and the self-terms onto different output guides 222 and 224 respectively, ideally leading to a substantially background-free measurement. When used in conjunction with an A-QPM non-linear material, this configuration may be used to perform measurements in a non-colinear geometry with high sensitivity.

In a further example, an A-QPM nonlinear material may be used in an apparatus and method for performing spectrally and temporally resolved upconversion (STRUT) for ultrashort signal measurement. FIG. 13 illustrates the basic configuration. The input pulse 1 is divided into two components, and a first component is directed to the A-QPM material 85 by a fixed path comprising the beamsplitter 2, and mirrors 72. The second component is passed through a variable time delay 5 and a filter 131 which may have a differential time delay versus frequency with respect to the first component path. The output of filter 131 is directed to the A-QPM non-linear material 85 such that it may interact with the signal that has taken the first path. The signal output of the A-QPM material 85 is resolved by a spectrometer 132. When the time delay σ is varied, the time-delayed input pulse will sample and upconvert the signal in the second path, where the frequency of the portion of the second signal that is upconverted is related to the time delay. Other similar configurations which make use of the time sampling and upconversion properties of the general arrangement will be apparent to persons skilled in the art.

In still another example, a frequency-resolved optical gating (FROG) measurement may be based on the use of a A-QPM non-linear material. For example, in the arrangement shown in FIG. 7, the photodetector 10 may be replaced with a spectrometer 120. This permits the second harmonic beam to be frequency resolved prior to being detected. Thus the separate optical frequencies are separated and detected separately, resulting in a two-dimensional data set. The set is intensity versus delay and second harmonic frequency, from which the full pulse amplitude and phase information can be extracted.

In yet another example, the polarization sensitivity of non-linear materials can be mitigated by introducing a polarization scrambling device at the input to any of the apparatus or methods previously described. In some situations, a Lyot depolarizer can be used, such that the polarization of a wide bandwidth signal varies sufficiently rapidly with wavelength so that the effect of the state of input polarization and its variation may be minimized. For a conventional depolarizer, the rate of change of polarization should be set such that it is rapid with respect to the variation of the differential time delay in the measurement apparatus or method, but slow with respect to the duration of a single pulse. In such a manner, the input pulse polarization may have minimal effect on the values measured.

It will be evident to persons of skill in the art that the optical paths may be formed using bulk optics, fiber optics or other waveguide techniques to form the configurations described.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

It is therefore intended that the foregoing detailed description be regarded as illustrative rather than limiting, and that it be understood that it is the following claims, including all equivalents, that are intended to define the spirit and scope of this invention.

The invention claimed is:

1. An apparatus for characterizing optical signals, comprising:
   an aperiodically microstructured quasi-phase-matched non-linear optical material (A-QPM) having an input side and an output side;
   a first optical device directing a first optical signal and a second optical signal to the input side; and
   a detector disposed at the output side,
   wherein a time delay between the first optical signal and the second optical signal is variable when measured at the input side;
   a detector disposed at the output side,
   wherein a time delay between the first optical signal and the second optical signal is variable when measured at the input side.

2. The apparatus of claim 1, wherein the A-QPM is comprised of a lithium niobate material.

3. The apparatus of claim 2, wherein the lithium niobate material is microstructured by poling.

4. The apparatus of claim 1, wherein the A-QPM is a waveguide.

5. The apparatus of claim 1, wherein the second signal is a portion of the first signal.

6. The apparatus of claim 5 wherein the second signal is time delayed with respect to the first signal in an interferometer.

7. The apparatus of claim 1, wherein the first optical device includes an optical fiber.

8. The apparatus of claim 1, wherein one of the first optical signal or the second optical signal is routed through a second optical device to be characterized.

9. The apparatus of claim 1, wherein one of the first and the second optical signal is a pulse pair.

10. The apparatus of claim 9, wherein the other of the first and second optical signal traverses a chirp filter.

11. The apparatus of claim 1, wherein the output side communicates with the detector through an optical fiber.

12. The apparatus of claim 1, wherein the detector is a spectrometer.

13. The apparatus of claim 12, wherein the spectrometer includes a detector array.

14. The apparatus of claim 1, wherein the detector is a photodetector.

15. The apparatus of claim 14, wherein the photodetector is a semiconductor device.

16. The apparatus of claim 1, wherein the detector further comprises a lock-in amplifier.

17. The apparatus of claim 1, wherein the A-QPM is apodized.

18. The apparatus of claim 1, where a polarization scrambler or depolarizer is disposed in a path of at least one of the first signal or the second signal.

19. The apparatus of claim 18, wherein the polarization scrambler provides a depolarization time such that an effect of polarization variation on a detected signal amplitude is substantially eliminated.

20. The apparatus of claim 19, where the depolarizer is a Lyot depolarizer.

21. The apparatus of claim 1, wherein an optical filter having a passband centered at approximately twice a center frequency of an input optical signal is disposed between the output side of non-linear optical material and the optical detector.

22. The apparatus of claim 1, wherein the first and second optical signals that are directed to the input side are colinear.

23. An apparatus for measuring the intensity autocorrelation function of an optical signal comprising:
   an optical differential time delay device;
   a non-linear optical material; and
   an optical detector,
   wherein the optical differential time delay device has a variable time delay, and the non-linear optical material is an aperiodically microstructured quasi-phase matched material (A-QPM).

24. The apparatus of claim 23, where the A-QPM is comprised of a lithium niobate material.

25. The apparatus of claim 24, wherein the lithium niobate is microstructured by poling.

26. The apparatus of claim 23, wherein the A-QPM is apodized.

27. The apparatus of claim 23, wherein the optical differential time delay device further comprises:
   a splitter dividing an input optical path into a first optical path and a second optical path, wherein the first optical path has a fixed time delay and the second optical path has a variable time delay;
   wherein the first optical path and the second optical path are combined prior to being input to a proximal end of the non-linear optical material.

28. The apparatus of claim 27, wherein the combined optical paths are collinear at a proximal end of the non-linear optical material.

29. The apparatus of claim 27, wherein the first optical path and the second optical path are combined by a beamsplitter or a fiber directional coupler.

30. The apparatus of claim 27, wherein the first optical signal and the second optical paths are not co-linear at a proximal end of the non-linear optical material.

31. The apparatus of claim 30, wherein the means for combining is a mirror and a lens.

32. The apparatus of claim 27, wherein the splitter is a fiber directional coupler.

33. The apparatus of claim 27, wherein a chopper is disposed in a signal path on a first side of the A-QPM and the detector is disposed on a second side of the A-QPM, and the optical detector further comprises a lock-in amplifier.

34. The apparatus of claim 23, wherein an input optical pulse to the optical differential time delay device has a duration of between approximately 50 femtoseconds and approximately 750 femtoseconds.

35. The apparatus of claim 23, where a polarization scrambler or depolarizer is disposed at an input of the differential optical time delay device.

36. The apparatus of claim 35, wherein the polarization scrambler provides a depolarization time such that an effect of input polarization variation on a detected signal amplitude is substantially eliminated.

37. The apparatus of claim 36, where the depolarizer is a Lyot depolarizer.

38. The apparatus of claim 23, wherein an optical filter having a passband centered at approximately twice a center frequency of an input optical signal is disposed between a distal end of the non-linear optical material and the optical detector.

39. The apparatus of claim 38, wherein an optical iris is disposed between the output of the non-linear optical material and the optical filter.

40. The apparatus of claim 38, wherein the optical filter is an asymmetrical waveguide Y-junction.

41. The apparatus of claim 23, wherein the A-QPM is a waveguide.

42. An apparatus for measuring the characteristics of a signal comprising:
   a splitter;
   an optical variable time delay inserted in one of a first signal path or a second signal path;
   an optical filter inserted in one of a first signal path or a second signal path;
   a signal combiner, combining the first signal path and the second signal path;
   a non-linear material having A-QPM characteristics; and
   an optical detector.

43. An apparatus for measuring the characteristics of a signal, comprising:
   a pulsed optical source generating a first signal, said source having a repetition period synchronized with that of a second signal;
   a variable time delay device inserted in one of a first signal path or a second signal path;
   a signal combiner, combining an output of the variable time delay unit and the signal path not traversing the variable time delay unit;
   a non-linear material having A-QPM characteristics; and
   an optical detector.

44. An apparatus for measuring the characteristics of a signal comprising:
   a pulsed optical source generating a first signal having a first signal path, said the first signal having a repetition period asynchronous with that of a second signal, the second signal having a second signal path;
   a signal combiner, combining the first signal path and the second signal path;
   a non-linear material having A-QPM characteristics;
   an optical detector; and
   a variable time delay device inserted in one of the first signal path or the second signal path.

45. An apparatus for measuring the distance to an object, comprising:
   an optical pulse generator;
   a first optical signal and a second optical signal, the first optical signal directed towards an object and the second optical signal input to a optical variable time delay device, wherein a first output of the optical variable time delay device is directed onto a proximal end of a aperiodically microstructured non-linear optical material (A-QPM);
   a lens disposed so as to direct optical energy reflected or scattered from the object onto the proximal end of the A-QPM; and
   a detector disposed facing a distal end of the A-QPM.

46. An apparatus for measuring the characteristics of a signal comprising:
   a splitter;
   an optical differential time delay device inserted in one of a first signal path or a second signal path;
   a chirp filter inserted in a one of the first signal path and the second signal path not traversing the optical differential pulse generator;
   a signal combiner, combining an output of the optical differential time delay generator and the output of the chirp filter;
   a non-linear material having A-QPM characteristics; and
   an optical detector.

47. The apparatus of claim 46, wherein the optical detector is a spectrometer.

48. The apparatus of claim 46, wherein the optical differential time delay device further comprises:
   a splitter dividing one of the first or the second optical path into a third optical path and a fourth optical path, wherein the third optical path has a fixed time delay and the fourth path has a variable time delay.

49. A method of characterizing an optical signal, the method comprising:
   providing an aperiodically microstructured quasi-periodic non-linear material (A-QPM), the A-QPM having an input side and an output side;
   directing a first optical signal and a second optical signal to the input side;
   varying a time delay between the first optical signal and the second optical signal; and
   detecting a power of an optical signal at the output side at a frequency not present in any of the first optical signal and the second optical signal.

50. The method of claim 49, further comprising:
   passing an optical pulse signal through a beamsplitter to produce the first optical signal and the second optical signals.

51. An apparatus for measuring the characteristics of an optical device:
   a splitter, having a first optical path and a second optical path;
   an optical variable time delay device disposed in at least one of the first optical path or the second optical path;
   a non-linear optical material; and
   an optical detector,
   wherein an optical device is disposed in one of the first or the second optical path, wherein the non-linear optical material is an aperiodically microstructured quasi-phase matched material (A-QPM).

52. The apparatus of claim 51, wherein the A-QPM is apodized.

* * * * *

UNITED STATES PATENT AND TRADEMARK OFFICE
CERTIFICATE OF CORRECTION

PATENT NO. : 7,570,851 B2
APPLICATION NO. : 11/172620
DATED : August 4, 2009
INVENTOR(S) : Andrew M. Weiner Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 185 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,570,851 B2  Page 1 of 1
APPLICATION NO. : 11/172620
DATED : August 4, 2009
INVENTOR(S) : Andrew M. Weiner It is certified that error appears in the above-identified patent and that said Letters Patent is hereby corrected as shown below:

In the Claims

In column 11, claim 1, line 15, immediately after "input side" replace ";" with --.--.

In column 11, claim 1, delete lines 16, 17, 18, and 19 in their entirety.

In column 12, claim 35, lines 49-50, after "an input of the" replace "differential optical" with --optical differential--.

In column 14, claim 50, line 37, replace "signals" with --signal--.

Signed and Sealed this

Twenty-eighth Day of September, 2010

David J. Kappos
*Director of the United States Patent and Trademark Office*